United States Patent
Palin et al.

(10) Patent No.: US 7,408,872 B2
(45) Date of Patent: Aug. 5, 2008

(54) MODULATION OF SIGNALS FOR TRANSMISSION IN PACKETS VIA AN AIR INTERFACE

(75) Inventors: Arto Palin, Lempäälä (FI); Jukka Reunamaki, Tampere (FI)

(73) Assignee: Spyder Navigations, L.L.C., Wilmington, DE (US)

(*) Notice: Subject to any disclaimer, the term of this patent is extended or adjusted under 35 U.S.C. 154(b) by 619 days.

(21) Appl. No.: 10/483,367

(22) PCT Filed: Jul. 9, 2001

(86) PCT No.: PCT/EP01/07863

§ 371 (c)(1),
(2), (4) Date: Jul. 13, 2004

(87) PCT Pub. No.: WO03/007566

PCT Pub. Date: Jan. 23, 2003

(65) Prior Publication Data

US 2004/0240377 A1    Dec. 2, 2004

(51) Int. Cl.
*H04L 5/04* (2006.01)
(52) U.S. Cl. ............ 370/204; 370/205; 370/206; 370/213; 370/349
(58) Field of Classification Search ............ 370/204, 370/205, 206, 213
See application file for complete search history.

(56) References Cited

U.S. PATENT DOCUMENTS

| | | | |
|---|---|---|---|
| 5,706,428 A * | 1/1998 | Boer et al. | 370/342 |
| 5,995,515 A * | 11/1999 | Suzuki | 370/465 |
| 6,216,107 B1 * | 4/2001 | Rydbeck et al. | 704/500 |
| 6,330,288 B1 * | 12/2001 | Budka et al. | 375/296 |
| 6,438,176 B1 * | 8/2002 | Haran et al. | 375/303 |
| 6,463,042 B1 * | 10/2002 | Paatelma | 370/318 |
| 6,587,452 B1 * | 7/2003 | Davidovici et al. | 370/342 |

(Continued)

FOREIGN PATENT DOCUMENTS

EP    0 938 207    8/1999

(Continued)

OTHER PUBLICATIONS

"Specification of the Bluetooth System," vol. 1, Version 1.1, Feb. 22, 2001, Part A, Chapter 3.1, "Modulation Characteristics," https://www.bluetooth.org/spec/.

(Continued)

*Primary Examiner*—Hassan Kizou
*Assistant Examiner*—Wutchung Chu

(57) ABSTRACT

The invention relates to a method and to a modulator for modulating signals. The signals are to be transmitted by a device in packets via an air interface. Each packet is supposed to comprise at least one entity of at least two different entities, which different entities are employed for transmitting signals representing different kinds of information. In order to enable a higher data rate, signals that are to be transmitted in at least one of said different entities are modulated with a first set of values of at least one modulation parameter of a selected modulation scheme. Further, signals that are to be transmitted in at least one other of said different entities are modulated with a second set of values of said at least one modulation parameter, said second set of values comprising less values than said first set of values.

25 Claims, 4 Drawing Sheets

U.S. PATENT DOCUMENTS

| | | | |
|---|---|---|---|
| 6,643,469 B1 * | 11/2003 | Gfeller et al. | 398/162 |
| 6,647,077 B1 * | 11/2003 | Shan et al. | 375/346 |
| 6,717,934 B1 * | 4/2004 | Kaasila et al. | 370/347 |
| 6,865,235 B2 * | 3/2005 | Khoini-Poorfard | 375/272 |
| 6,882,679 B2 * | 4/2005 | Somayazulu et al. | 375/146 |
| 6,987,754 B2 * | 1/2006 | Shahar et al. | 370/349 |
| 7,027,530 B2 * | 4/2006 | McFarland et al. | 375/341 |
| 7,046,649 B2 * | 5/2006 | Awater et al. | 370/338 |
| 7,058,114 B2 * | 6/2006 | Dabak et al. | 375/136 |

FOREIGN PATENT DOCUMENTS

| | | |
|---|---|---|
| WO | WO 00/30288 | 5/2000 |

OTHER PUBLICATIONS

Scoope FIR, "*Tutorial: Raised Cosine Filter Design*," 3 pages.

Vijaya Chandran Ramasami, "*Raised Cosine Filter Design*," 4 pages.

* cited by examiner

MODULATION OF SIGNALS FOR TRANSMISSION IN PACKETS VIA AN AIR INTERFACE

CROSS REFERENCE TO RELATED APPLICATIONS

This application is for entry into the U.S. national phase under §371 for International Application No. PCT/EP01/07863 having an international filing date of Jul. 9, 2001, and from which priority is claimed under all applicable sections of Title 35 of the United States Code including, but not limited to, Sections 120, 363 and 365(c).

FIELD OF THE INVENTION

The invention relates to a method for modulating signals in a device, which signals are to be transmitted by said device in packets via an air interface, each packet comprising at least one entity of at least two different entities, said at least two different entities being employed by said device for transmitting signals representing different kinds of information. The invention equally relates to a corresponding modulator and demodulator. The invention further relates to a device comprising such a modulator and/or such a demodulator and to a wireless communications network comprising at least a device with such a modulator.

BACKGROUND OF THE INVENTION

Transmitting modulated signals which are arranged in packets via the air interface is known for example for short-range radio links established between different devices. Short-range radio links can be employed for connecting devices located close to each other without requiring connections by cords.

Short-range radio links between electronic devices have been specified in the global "Specification of the Bluetooth system", v1.1, Feb. 22, 2001. The specification is aimed at providing a standard for low complexity low-cost wireless connections between portable and/or fixed devices, in particular devices which are located within a range of 10 meters to each other. An example for the employment of such a Bluetooth™ short-range radio link would be a wireless connection between a laptop or mobile phone and a printer.

Transmissions between devices as defined by Bluetooth™ are based on a frequency hopping system using 79 channels with 1 MHz each in the 2.45 GHz ISM (Industrial, Scientific and Medical) band. The data is transmitted in packets, and each packet is transmitted on a different hop frequency. In the specification, three different packet structure are defined. A first structure includes only an access code of 68 bits, a second structure includes an access code of 72 bits and a header entity of 54 bits, while a third structure includes an access code of 72 bits and a header entity of 54 bits and a payload entity ranging from zero to a maximum of 2745 bits. Each packet starts with the access code, which is used inter alia for synchronization purposes.

Any device can request a link to other devices, the requesting device being a master and the respective other devices being slaves. Connections can be point-to-point between one master and one slave, or point-to-multipoint between one master and several slaves sharing the same channel. A channel is defined by the hopping sequence used, whereas the hopping sequence is determined by the Bluetooth™ device address of the master. Two or more devices sharing the same channel form a piconet. All slaves in one piconet are synchronized to the system clock of the master. To this end, in a receiver of a slave a sliding correlator correlates against the access code of a received packet and triggers when a threshold is exceeded. This trigger signal is used to determine the receive timing.

According to the current Bluetooth™ specification, signals are modulated for transmission using a GFSK (Gaussian Frequency-Shift Keying) modulation scheme. More specifically, it is requested that a bit of '1' is represented by a positive frequency deviation from the transmit frequency, and that a bit of '0' is represented by a negative frequency deviation from the transmit frequency. It is further requested that the minimum absolute frequency deviation achieved by a bit sequence of '1010' is at least 80% of the absolute frequency deviation achieved by a bit sequence of '00001111'. With the requested modulation scheme, a gross data rate of 1 Mbit/s, corresponding to a symbol rate of 1 Ms/s, can be achieved.

It is a declared aim to at least double the currently specified medium data rate at low cost to a gross data rate of 2 Mbit/s or higher. It is important that a higher data rate system is fully backward compatible with the current specification, in order to ensure that current devices are also capable to operate as a slave in piconets that comprise higher data rate devices.

A further request for higher data rate devices relates to the synchronization of devices in a piconet. Since in the current piconets, the synchronization of a device can be based on the access code transmitted by the respective master in the first entity of each packet, it should be ensured that current devices can also decode the access code of transmissions employing a higher data rate. Preferably, a current Bluetooth™ device should also be able to decode the header of received packets, the header comprising e.g. an indication of the slave to which the packet is addressed, an indication of the type of the packet and thus an indication of the length of the packet.

Different proposals were made to increase the medium data rate for Bluetooth™ transmissions. In order to achieve a simple backward compatibility, all proposals are based on a modulation scheme similar to the scheme defined in the current specification for modulating access code and header. Only the payload is supposed to be modulated with a different modulation scheme enabling a higher data rate. Because of the different modulation schemes employed in all these proposals for access code and header on the one hand and payload on the other hand, the modulation scheme has to be changed between the modulation of the access code and the header and the modulation of the higher data rate payload. A change of the modulation scheme, however, requires a guard time between the modulation of the header and the payload. With some modulation schemes, even a new synchronization entity is required for symbol re-synchronization. Both, the guard time and a new synchronization, add complexity to the system and reduce the total achievable data rate.

In order to provide a comprehensive backward compatibility, a demodulator according to the invention should further comprise second demodulating means for demodulating other received signals which were modulated with a second modulation scheme. If this second modulation scheme is e.g. the GFSK modulation required by the current Bluetooth™ specification, the demodulator is able to demodulate signals modulated according to the invention and equally signals modulated by a current Bluetooth™ device.

In U.S. Pat. No. 5,706,428, it is proposed that the initial portion of a message is transmitted in a wireless data communication system at a first predetermined one of a first plurality of data rates and that the data portion of the message is transmitted at a selected one of a second plurality of data rates. For each of the data rates, another modulation scheme is used.

An equally proposed demodulator is suited for demodulating modulated signals originating from the proposed modulator. Such a demodulator comprises therefore demodulating means for demodulating received signals with a demodulation scheme corresponding to the selected modulation scheme, and processing means for processing the demodulated signals for regaining the original signals before modulation. The processing depends on the set of values of the at least one modulation parameter of the selected modulation scheme used for modulation. A method for demodulating signals comprises corresponding steps.

Further proposed is a device comprising the proposed modulator and/or the proposed demodulator and a wireless communications network comprising at least one such device.

The invention proceeds from the idea that a single modulation scheme can be employed for transmitting signals with different bit rates. This is achieved according to the invention by applying on the one hand a first set of the values of at least one parameter of a selected modulation scheme on signals that are to be modulated, and on the other hand a second set of these values. If both sets comprise different numbers of values of said at least one parameter, different entities of a packet can be modulated with different bit rates without requiring a guard time between the different entities for switching the modulation scheme and without requiring a re-synchronization. If the modulation scheme and the two sets of values of modulation parameters are selected suitably, the signals modulated with the set comprising less values can then be demodulated for example by demodulators not supporting a demodulation of signals modulated with a larger set of values. Since the invention moreover results only in a small increase of complexity in a modulator, demodulator, device or communications system, it can further be realized at low costs.

Preferred embodiments of the invention become apparent from the dependent claims.

The first set of values of the at least one modulation parameters preferably comprises all values of the at least one modulation parameter of the selected modulation scheme. This enables a maximum bit rate for the signals modulated with the first set of values. Alternatively, the first set of values can comprise only a subset of all values of the at least one modulation parameter, as long as it is ensured that the first set comprises more values than the second set of values.

The invention can be employed in particular, though not exclusively, for short-range radio links, like Bluetooth™.

In a preferred embodiment of the invention, a packet can consist of an entity with synchronization information and/or an entity with payload data. It is proposed that the payload data is modulated with the first set of the selected modulation scheme, in order to enable a higher data rate for transmission. At the same time it is proposed to modulate the synchronization information with the second set of values, resulting in a second reduced transmission rate, in order to allow also devices not supporting a demodulation of signals transmitted with the higher data rate to demodulate at least the synchronization part of a packet.

In case the invention is employed for a system employing a structure of packets similar to the Bluetooth™ system, it is proposed that the access code entity and, if present, the header entity of each packet are modulated with a reduced modulation scheme, while the payload entity, if present, is modulated with the first set of the values of modulation parameters of the selected modulation scheme. A possibility to demodulate in addition to the access entity also the header entity of each packet can be of interest for receiving devices, since the header entity indicates for example the length of the respective packet.

In a further preferred embodiment of the invention, the selected modulation scheme is a $\pi/4$-DQPSK modulation scheme (Differential Quadrature Phase Shift Keying), which employs $+135°$, $+45°$, $-45°$ and $-135°$ phase changes for modulation. If all phase changes are allowed, i.e. if the entire set of this modulation scheme is employed, a higher data rate is achieved than e.g. with the GFSK modulation scheme (Gaussian Frequency Shift Keying) employed according to the current Bluetooth™ specification. The second set of values when using this scheme used for modulating the access code and the header could then include e.g. only $\pm 45°$ phase changes. This subset leads to the same data rate for the access code and the header of a packet. In the whole, the medium gross data rate is thus higher than with the GFSK modulation scheme of the Bluetooth™ specification.

Preferably, a $\pi/4$-DQPSK modulation scheme employs a raised cosine filter for pulse shaping with a roll-off factor of 0.8. This ensures that signals modulated with the reduced modulation scheme using only phase changes of $\pm 45°$ can be demodulated with current Bluetooth™ devices. It is to be noted, though, that the selection of $+450$ phase changes for a reduced modulation scheme, as well as the use of a raised cosine filter with a roll-off factor of 0.8 are only to be understood as example which can be varied in any suitable way.

In a $\pi/4$-DQPSK modulation scheme, for each phase change a set of two bits is mapped to one of the four available phase changes. In order to restrict the changes to only two possible phase changes, one bit of each pair of bits can be frozen to either '0' or '1'. Thus, only one of the two bit of each set of bits influences the mapping, leading to a reduced mapping to only two of four available phase changes. With such an approach, a gross data rate of up to 2 Mbit/s, corresponding to a symbol rate of 1 Ms/s, and a maximum user data rate of 1.4 Mbit/s can be achieved for connections employing the currently defined Bluetooth™ payload types. The maximum user data rate is twice that of the current Bluetooth™ user data rate.

Instead of a $\pi/4$-DQPSK modulation scheme also other modulation schemes can be employed. In particular, more complex modulation schemes than QPSK can be selected. An 8PSK modulation scheme would be suited for instance for a payload modulation in some cases which require a high speed transmission speed but only a short transmission distance. In a Bluetooth™ system, for instance, the access code and the header can then be modulated in a similar manner as proposed for DQPSK, thus a synchronization of current devices to transmitted packets remains possible. With more complex modulation schemes, even higher gross medium data rates than 2 Mbit/s can be achieved easily.

A control signal can be employed for selecting the beginning of the payload and thus for switching from using only a subset of the modulation scheme to using the whole modulation scheme.

In another embodiment of the invention, fixed values are added already in the baseband to the signals which are to be modulated with the first set of values. More specifically, bits of '0' and/or '1' are added in the baseband to the regular bits. Then, the required change between a modulation with the second set of values and a modulation with the first set of values is achieved automatically in the modulator.

Preferably, the modulation is based on a lookup table, according to which signals that are to be transmitted are mapped to different values for the modulation, e.g. to the different phase changes employed in a π/4-DQPSK modulation scheme.

Advantageously, a modulator according to the invention is moreover able to support two different modulation schemes. These two modulation schemes can then be applied to signals that are to be transmitted alternatively, depending on the desired connection. They can also be applied in parallel, the currently appropriately modulated signals then being selected for transmission. If employed in a Bluetooth™ system, the second modulation scheme should be the GFSK modulation scheme defined in the current Bluetooth™ specification.

In case two modulation schemes are supported, a first lookup table can be provided for a mapping according to the invention, and a second lookup table can provided for a mapping for a conventional modulation scheme. A new modulator supplied with these two lookup tables is then able to modulate signals that are to be transmitted with the modulation scheme available at another device with which it wants to communicate.

BRIEF DESCRIPTION OF THE FIGURES

In the following, the invention is explained in more detail with reference to drawings, of which

DETAILED DESCRIPTION OF THE INVENTION

Figure 1:
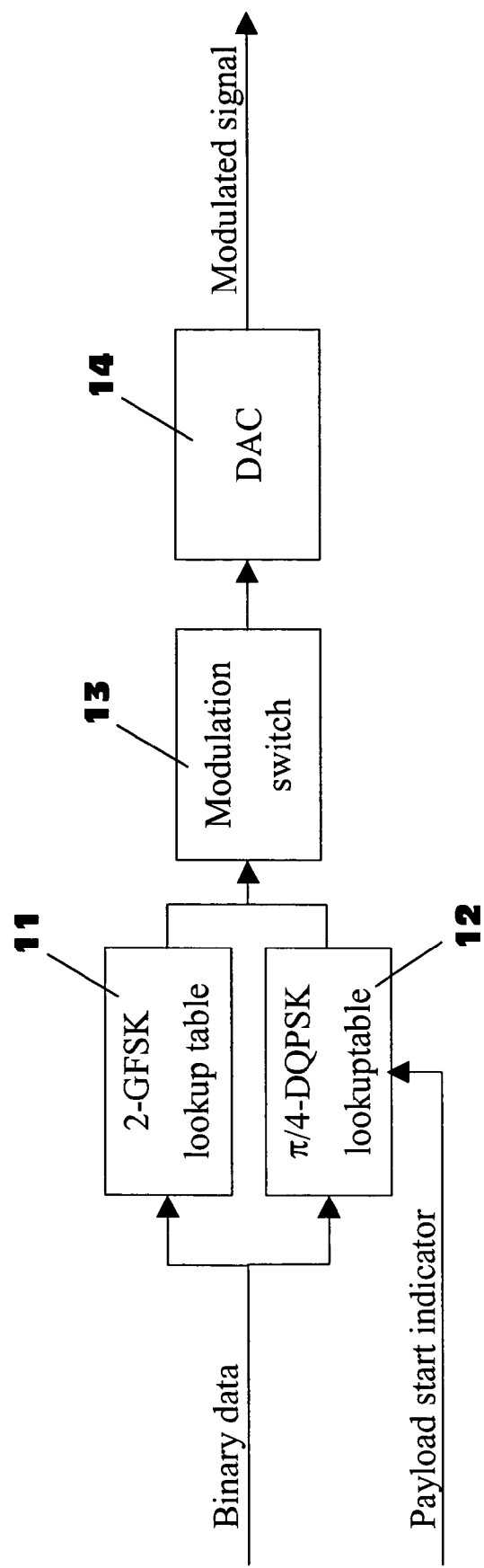
FIG. 1 shows a block diagram of a modulator for an embodiment of a device according to the invention.

FIG. 1 shows a block diagram of a modulator for an embodiment of an electronic device according to the invention. The device can be employed as master or slave in a Bluetooth™ piconet and supports connections using the medium data rate according to the current Bluetooth™ specification and as well connections using a higher data rate according to the invention.

The modulator of FIG. 1 comprises a first modulation block 11 including a 2-GFSK lookup table and a second modulation block 12 including a π/4-DQPSK lookup table. Both modulation blocks 11, 12 have an input to which binary data can be fed. The second modulation block 12 has an additional input for a control signal. The output of both modulation blocks 11, 12 is connected to a modulation switch 13. The modulation switch 13 is further connected to a digital-to-analogue converter DAC 14. The output of the DAC 14 forms the output of the modulator and is connected to radio transmitting means of a Bluetooth™ device which are not depicted in the figure.

The Bluetooth™ device with the depicted modulator is presently supposed to be employed as master in a piconet comprising as well other equivalent devices as current Bluetooth™ devices.

Binary data that is to be transmitted by the device is forwarded to both modulation blocks 11, 12.

In the first modulation block 11, the input bits are modulated with a conventional 2-GFSK modulation scheme including a mapping based on the provided 2-GFSK lookup table. The mapping is carried out according to the requirements in the current Bluetooth™ specification. Each bit is mapped separately and equally for an entire packet. The modulation in the first modulation block 11 enables transmissions with a gross medium data rate of 1 Mbit/s and is carried out for communications with current Bluetooth™ devices.

The second modulation block 12 is provided for enabling transmissions with a gross medium data rate of 2 Mbit/s for connections with other Bluetooth™ devices equipped according to the invention. The binary data input to this modulation block 12 is modulated to this end with a π/4-DQPSK modulation scheme including a mapping based on the included π/4-DQPSK lookup table. Instead of a single bit, always a set of two consecutive bits $b_0$, $b_1$ is mapped to a phase change in degrees according to the following table, which corresponds to the lookup table:

| Binary data ($b_0$, $b_1$) | Phase change (deg) |
|---|---|
| (1, 1) | +135 |
| (1, 0) | +45 |
| (0, 0) | −45 |
| (0, 1) | −135 |

The above lookup table is used in the second modulation block 12 for all data of a packet, but the respective two consecutive bits $b_0$, $b_1$ employed for the access code and header entities differ from those employed for the payload entity. For the modulation of the signals destined for an access code or header entity, each incoming bit is used as a first bit $b_0$ of a set of two consecutive bits, while a second bit $b_1$ always set to '0' is added after each incoming bit for the respective set of bits $b_0$, $b_1$. Therefore, only +45 and −45 degree phase changes can result for the access code and header signals according to the above depicted table. For each payload entity, in contrast, the bits input to the second modulation block 12 are alternately used as first and second bit $b_0$, $b_1$. Thus, for these payload bits, any combination of binary data of the first column of the above depicted table can occur. Consequently, the mapping can result in each of the four different phase changes of the second column of the above table.

The second modulation block 12 is informed about the transition from the access code and header entities to the payload entity by a payload start indication fed to the control input of the second modulation block 12. Since the actual modulation scheme does not have to be changed, which is always π/4-DQPSK, the switching can be carried out without any delay. The further processing of the resulting phase changes in the second modulation block corresponds to a conventional π/4-DQPSK modulation employing raised cosine pulses with a roll-off factor of 0.8.

Figure 2:
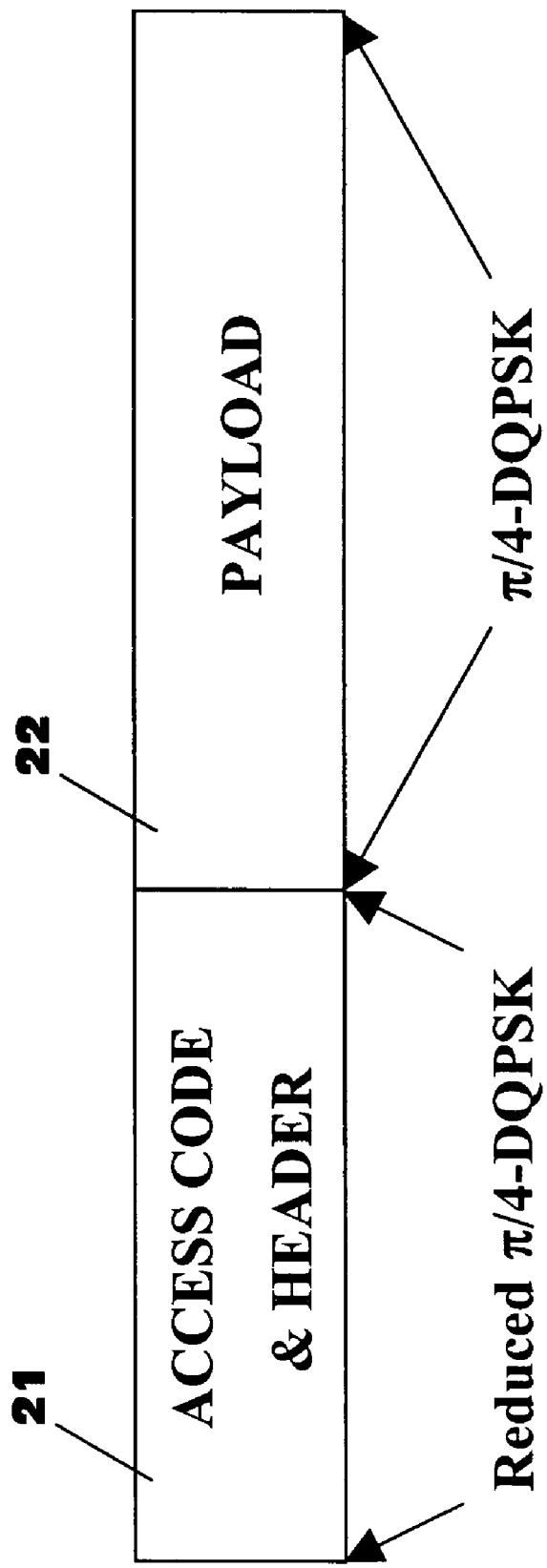
FIG. 2 illustrates the employment of different sets of a single modulation scheme for one packet.

FIG. 2 shows the structure of a Bluetooth™ packet with an indication of the modulation scheme employed by the second modulation block 12 of FIG. 1. A first section 21 of the packet contains the access code entity and the header entity, while a second section 22 of the packet corresponds to the payload entity. The signals in the first section 21 of the depicted packet were modulated with a reduced π/4-DQPSK modulation scheme using only a subset of the possible phase changes, while the signals in the second section 22 were modulated with the entire set of the employed π/4-DQPSK modulation scheme.

The modulated signals output by the two modulation blocks 11, 12 of the modulator of FIG. 1 are then provided to the modulation switch 13 of the modulator. Depending on the data rate suited for the present connection, the modulation switch 13 selects the signals of one of the modulation blocks 11, 12 and forwards them to the DAC 14. The DAC 14 transforms the digital signals into analogue signals and supplies the modulated analogue signals to the transmitting means of the device for transmission. The device employs the same frequency hopping scheme for transmitting packets as defined in the Bluetooth™ specification.

Figure 3:
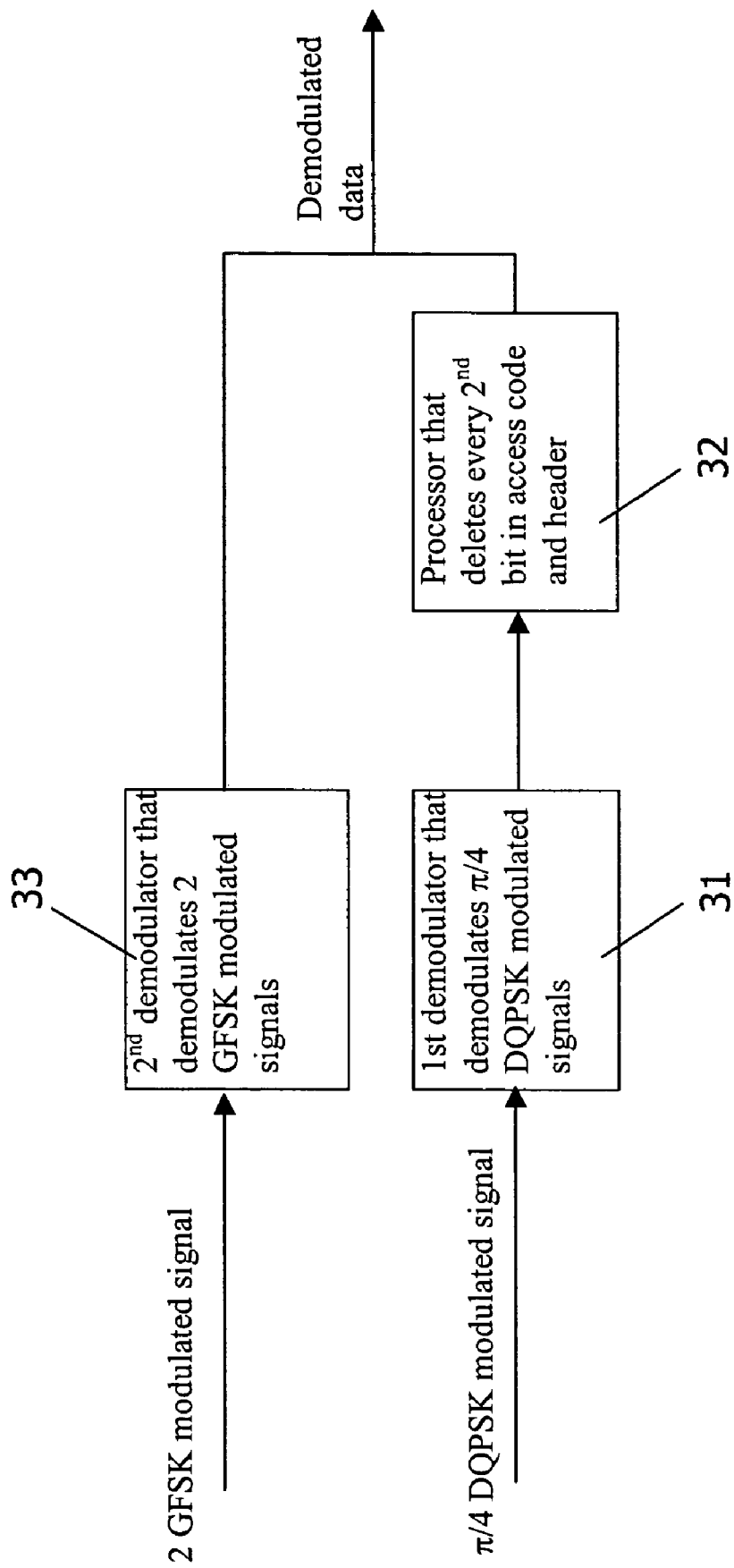
FIG. 3 is a schematic block diagram showing components of an overall demodulator.

The presented embodiment of a device according to the invention further comprises a demodulator capable of demodulating π/4-DQPSK modulated signals. This demodulator has to be able to differentiate between signals in the access code and header entity and the signals in the payload entity, in order to regain the original binary data correctly by deleting every second bit resulting in the demodulation of the signals in the access code and header entity. The demodulator should further be capable of demodulating received 2 GFSK modulated signals originating from current Bluetooth™ devices. FIG. 3 is a schematic block diagram presenting components of such a demodulator (31, 33). The demodulator comprises a first demodulator 31 for demodulating received π/4-DQPSK modulated signals. This first demodulator 31 is followed by a processor 32 that regains the original signals before modulation, that is, it deletes every second bit in the access code and the header entity of a demodulated signal. The demodulator further comprises a second demodulator 33 that demodulates received 2 GFSK modulated signals.

The presented device can be employed in a piconet with other devices according to the invention or with current Bluetooth™ devices, since it is able to transmit data that can be read by both, and since it is able to read data transmitted by either of them.

In addition, it is ensured that even when transmitting signals for a 2 Mbit/s connection, other devices of the piconet which are current Bluetooth™ devices can stay synchronized to the master, since the access code and header entities of the transmitted packets are modulated in a way that can be demodulated also by the current Bluetooth™ devices as will be explained in the following.

In the proposed reduced π/4-DQPSK modulation scheme, each phase change of +45° representing a first bit $b_0$ of '1' results in a temporary positive frequency deviation from the transmit frequency, similar to the positive frequency deviation representing each single bit of '1' in the 2 GFSK modulation. Each phase change by −45° representing a first bit $b_0$ of '0' results in a temporary negative frequency deviation from the transmit frequency, similar to the negative frequency deviation representing each single bit of '0' in the 2 GFSK modulation. With the employed raised cosine pulse and the proposed roll-off factor of 0.8, the minimum frequency deviation from the transmit frequency for each bit requested by the Bluetooth™ specification as mentioned in the background of the invention can be achieved also for the reduced π/4-DQPSK modulation. Therefore, a current Bluetooth™ device will be able to correctly demodulated received signals which were modulated with the proposed reduced π/4-DQPSK modulation scheme.

Hence a master devices corresponding to the described embodiment of the invention can easily support 1 Mbit/s links and 2 Mbit/s links at the same time.

In addition, the receiver of the proposed device does not have to employ different polling intervals for 1 Mbit/s links and 2 Mbit/s links, since it is ensured that the transmission rate of access code and header information is the same for both links.

The proposed modulation scheme does not fulfill the bandwidth requirements of a bandwidth of −20 dBc defined in the approval standard CFR47, part 15, section 247 by the Federal Communications Commission (FCC), USA. But the maximum average power is below 1 mW so that section 249 of the same part of the standard applies. This section relaxes the bandwidth requirements of section 247 to a level to which the system is able to conform.

Figure 4:
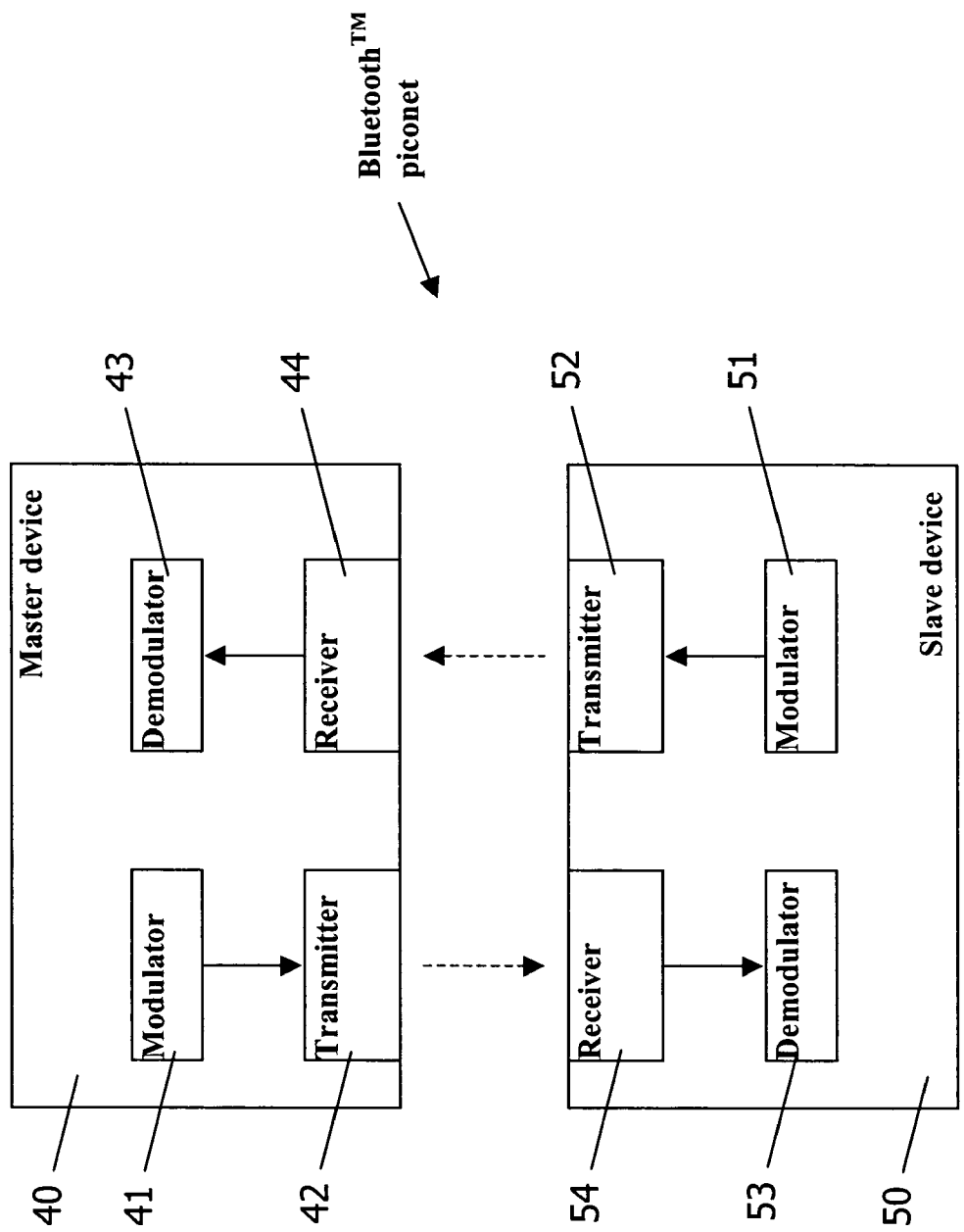
FIG. 4 is a diagram showing a communication system according to the present invention.

FIG. 4 presents a Bluetooth™ piconet as a communication system in which the presented device can be employed. The piconet includes the presented device as master device 40 and a second, identical device as slave device 50. Each of the devices 40, 50 comprises a respective modulator 41, 51 as shown in FIG. 1, which is connected to respective transmitter 42, 52. Each of the devices 40, 50 further comprises a respective demodulator 43, 53 as shown in FIG. 3, which is connected to respective receiver 44, 54. The master device and the slave device are thus able to exchange modulated 2 Mbit/s signals with each other. Nevertheless, possible other devices of the piconet which are current Bluetooth™ devices (not shown) are able to demodulate the access code and header entities of the transmitted packets as explained above.

The invention claimed is:

1. A method for modulating signals, wherein signals are to be transmitted by a device in packets via an air interface, the method comprising:
   receiving a first plurality of bits and a second plurality of bits,
   creating a pair of bits by adding a set bit to a first bit of said first plurality of bits, wherein one of said set bit and said first bit of said first plurality of bits has a fixed value, and
   mapping one of a first set of values to said pair of bits according to a selected modulation scheme and mapping a second set of values to said second plurality of bits according to said selected modulation scheme.

2. A method according to claim 1, wherein said second set of values comprises all values of said first set of values.

3. A method according to claim 1, wherein said first plurality of bits represents synchronization information and said second plurality of bits represents payload data.

4. A method according to claim 1, wherein said packets comprise at least one of an access code entity, a header entity, and a payload entity, of which entities the access code entity is included in each packet, wherein said access code entity and said header entity comprise said first plurality of bits and wherein said payload entity comprises said second plurality of bits.

5. A method according to claim 1, wherein said selected modulation scheme is a π/4-DQPSK (Differential Quadrature Phase Shift Keying) modulation scheme, using as values of at least one modulation parameter phase changes of −135°, +45°, −45° and −135° for modulation wherein said second set of values comprises all said phase changes, and wherein said first set of values comprises only phase changes of +45° and −45°.

6. A method according to claim 1, wherein said modulation scheme is a π/4-DQPSK (Differential Quadrature Phase Shift Keying) modulation scheme generating pulses with a raised cosine filter and a roll-off factor of 0.8.

7. A method according to claim 1, wherein a required change between a modulation with said first set of values and a modulation with said second set of values within one packet is indicated by a control signal.

8. A method according to claim 1, wherein a required change between a modulation with said first set of values and a modulation with said second set of values within one packet is achieved by adding in the baseband level at fixed positions fixed values to the signals which are to be modulated with said second set of values.

9. A method according to claim 1, wherein in addition to said selected modulation scheme, a second modulation scheme can be applied to signals that are to be transmitted via the air interface by said device, wherein said second modulation scheme enables a lower average data rate than said selected modulation scheme, and wherein it is determined in said device with which modulation scheme signals are to be modulated for transmission according to the capabilities of a second device to which the to be transmitted packets are addressed.

10. A method according to claim 1, wherein the modulation of signals with a modulation scheme comprises mapping said signals to values according to a lookup table provided for said modulation scheme.

11. A method for demodulating signals which were modulated with a selected modulation scheme according to claim 1, characterized by the steps of:
　demodulating said modulated signals with a demodulation scheme corresponding to said selected modulation scheme; and
　processing said demodulated signals for regaining the original signals before modulation, said processing depending on the set of values of said selected modulation scheme used in said modulation.

12. A modulator for modulating signals that are to be transmitted by a device in packets via an air interface the modulator comprising:
　modulating means for mapping a first set of values to pairs of bits according to a selected modulation scheme, wherein a first plurality of bits comprises said pairs of bits and wherein at least one of said bits of said pair of bits has a fixed value wherein the modulating means comprise means to further map a second set of values to a second plurality of bits according to said selected modulation scheme.

13. A modulator according to claim 12, wherein said first plurality of bits represents synchronization information and said second plurality of bits represents payload data.

14. A modulator according to claim 12, wherein said packets comprise at least one of an access code entity, a header entity, and a payload entity, of which entities the access code entity is included in each packet wherein said access code entity and said header entity comprise said first plurality of bits and wherein said payload entity comprises said second plurality of bits.

15. A modulator according to claim 12, wherein said selected modulation scheme is a π/4-DQPSK (Differential Quadrature Phase Shift Keying) modulation scheme using as values of at least one modulation parameter phase changes of +135°, +45°, −45° and −135' for modulation, wherein said modulating means use for said second set of values all said phase changes, and wherein said modulating means use for said first set of values only phase changes of +45 and −45°.

16. A modulator according to claim 12, wherein said selected modulation scheme is a π/4-DQPSK (Differential Quadrature Phase Shift Keying) modulation scheme, and wherein said modulating means comprise a raised cosine filter with a roll-off factor of 0.8 for generating pulses.

17. A modulator according to claim 12, further comprising means for supplying a control signal to said modulating means, which control signal indicates whether a change between a modulation with said first set of values and a modulation with said second set of values is required.

18. A modulator according to claim 12, further comprising means for adding in the baseband level fixed values at fixed positions to signals which are to be modulated with said second set of.

19. A modulator according to claim 12, further comprising second modulating means for modulating signals that are to be transmitted via the air interface by said device with a second modulation scheme, wherein said second modulation scheme enables a lower average data rate than said selected modulation scheme, and selection means for selecting signals modulated by said first modulating means or signals modulated by said second modulating means for transmission, according to the capabilities of a second device to which the signals are to be transmitted.

20. A modulator according to claim 12, wherein said modulating means comprise a lookup table for said selected modulation scheme according to which signals that are to be transmitted are mapped to some modulation value.

21. A device suited for establishing a wireless connection to at least one other device and comprising:
　a modulator comprising modulating means for mapping a first set of values to pairs of bits according to a selected modulation scheme, wherein a first plurality of bits comprises said pairs of bits and wherein at least one of said bits of said pair of bits has a fixed value, and further wherein the modulating means comprises means for mapping a second set of values to a second plurality of bits according to said selected modulation scheme; and
　transmitting means for transmitting signals modulated by said modulator via an air interface.

22. A communications system in which signals are transmitted via an air interface, characterized by at least one device comprising:
　a modulator comprising modulating means for mapping a first set of values to pairs of bits according to a selected modulation scheme, wherein a first plurality of bits comprises said pairs of bits and wherein at least one of said bits of said pair of bits has a fixed value, and further wherein the modulating means comprises means for mapping a second set of values to a second plurality of bits according to said selected modulation scheme; and
　transmitting means for transmitting signals modulated by said modulator via an air interface.

23. A demodulator for demodulating signals that are received in packets via an air interface, the demodulator comprising:
　demodulating means for demodulating received signals with a demodulation scheme corresponding to a selected modulation scheme, the signals comprising at least one of pairs of bits and a second plurality of bits, wherein said pairs of bits comprise a first plurality of bits and wherein one of said bits of said pairs of bits has a fixed value, the signals being modulated by one of a first set of values and a second set of values of said selected modulation scheme, and said demodulator comprising processing means for processing said demodulated signals for regaining the original signals before modulation, said processing depending on the set of values of said selected modulation scheme used in said modulation.

24. A demodulator according to claim 23, further comprising second demodulating means for demodulating received signals which were modulated with a second modulation scheme.

25. A device comprising:
　receiving means for receiving modulated signals via an air interface; and
　a demodulator comprising demodulating means for demodulating the modulated signals to obtain demodulated signals, wherein the modulated signals are demodulated with a demodulation scheme corresponding to a selected modulation scheme, the modulated signals comprising at least one of pairs of bits and a second plurality of bits, wherein said pairs of bits comprise a first plurality of bits and wherein one of said bits of said pairs of bits has a fixed value, the modulated signals being modulated by one of a first set of values and a second set of values of said selected modulation scheme, and said demodulator comprising processing means for processing the demodulated signals for regaining original signals, said processing depending on the set of values used in said selected modulation scheme.

* * * * *